United States Patent [19]
Perkins

[11] Patent Number: 5,327,946
[45] Date of Patent: Jul. 12, 1994

[54] FUEL FILLING AND VENTING DEVICE WITH SURGE PROTECTOR

[75] Inventor: Frederick M. Perkins, Ft. Lauderdale, Fla.

[73] Assignee: Perko, Inc., Miami, Fla.

[21] Appl. No.: 113,686

[22] Filed: Aug. 31, 1993

Related U.S. Application Data

[63] Continuation-in-part of Ser. No. 32,943, Mar. 17, 1993, Pat. No. 5,275,213, which is a continuation-in-part of Ser. No. 8,344, Jan. 22, 1993, abandoned.

[51] Int. Cl.⁵ .............................................. B65B 31/06
[52] U.S. Cl. .................................... 141/59; 141/44; 141/28; 137/387; 220/86.2; 220/88.2
[58] Field of Search .................. 141/59, 44–46, 141/98, 285, 286; 220/DIG. 33, 86.1, 86.2, 88.1, 88.2, 562, 563, 565; 177/587–589; 55/387

[56] References Cited

U.S. PATENT DOCUMENTS

| | | | |
|---|---|---|---|
| 3,334,667 | 8/1967 | Hedstrom | 141/46 |
| 3,385,468 | 5/1968 | Fleming et al. | |
| 3,907,153 | 9/1975 | Mutty | |
| 3,981,156 | 9/1976 | Modisette et al. | |
| 4,113,138 | 9/1978 | Fields et al. | |
| 4,265,752 | 5/1981 | O'Banion | |
| 4,450,880 | 5/1984 | Scheurebrand | 141/288 |
| 4,722,454 | 2/1988 | Fischer | |
| 4,730,652 | 3/1988 | Bartholomew | 141/302 |
| 4,769,050 | 9/1988 | Shaw et al. | |
| 4,809,863 | 3/1989 | Woodcock | |
| 4,854,469 | 8/1989 | Harguest | |
| 4,963,169 | 10/1990 | Granville | 55/188 |
| 5,103,877 | 4/1992 | Sherwood et al. | 141/59 |
| 5,131,439 | 7/1992 | Bucci | 141/59 |
| 5,275,213 | 1/1994 | Perkins | 141/59 |

Primary Examiner—Ernest G. Cusick
Attorney, Agent, or Firm—Laubscher & Laubscher

[57] ABSTRACT

A liquid fuel tank filling and venting device includes a hollow body member containing a chamber, an inlet opening for supplying fuel downwardly into the chamber, a fuel outlet opening for supplying fuel from the chamber, and a vent opening connected with the chamber, each of the fuel outlet and vent outlets being independently connected with the fuel tank, whereby overflow fuel is returned to the chamber via the vent outlet. A fuel cap is provided for closing the inlet opening, the fuel cap containing a vent passageway including both a back-flame arresting screen and a fuel surge protector, so that the tank is normally vented to atmosphere when the fuel cap is in the closed position, but the venting passageway automatically closed upon the occurrence of a fuel surge, thereby avoiding undesirable fuel leakage.

11 Claims, 3 Drawing Sheets

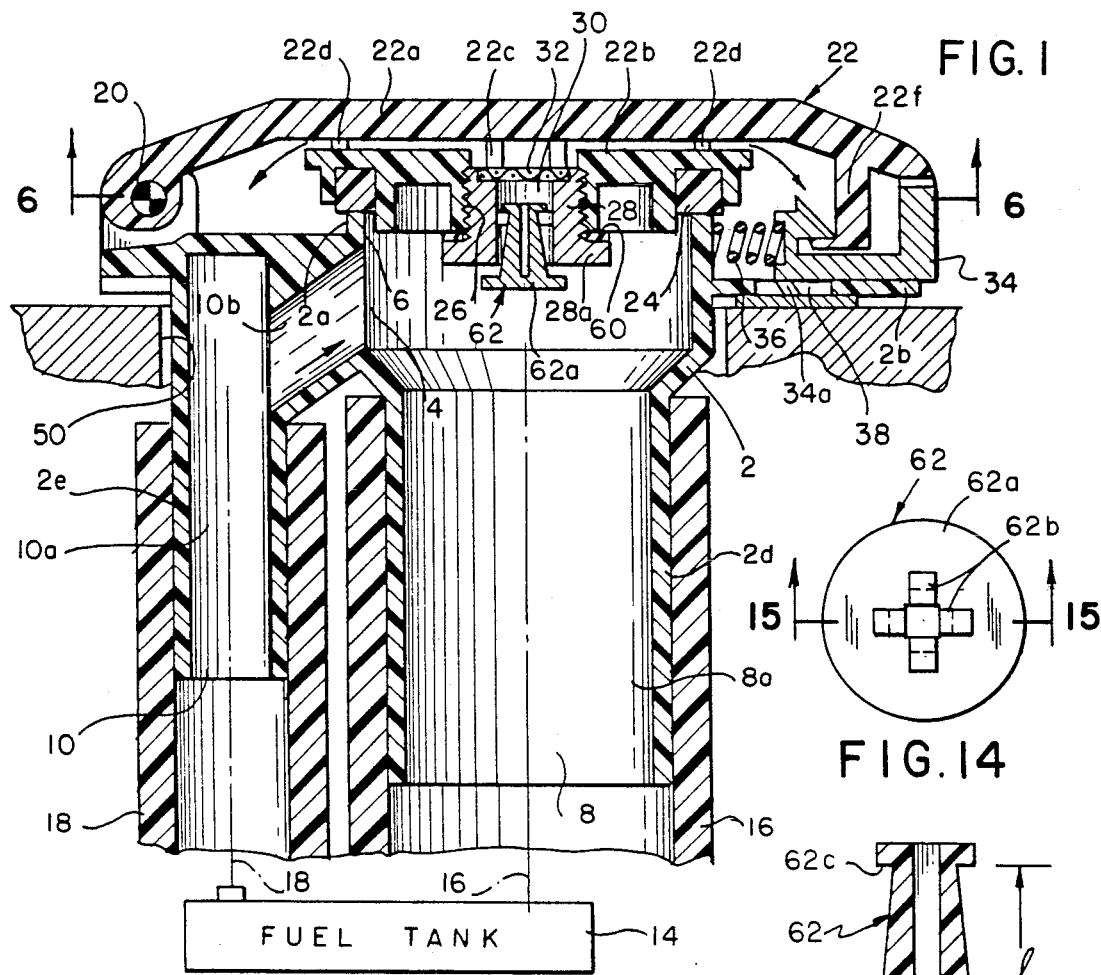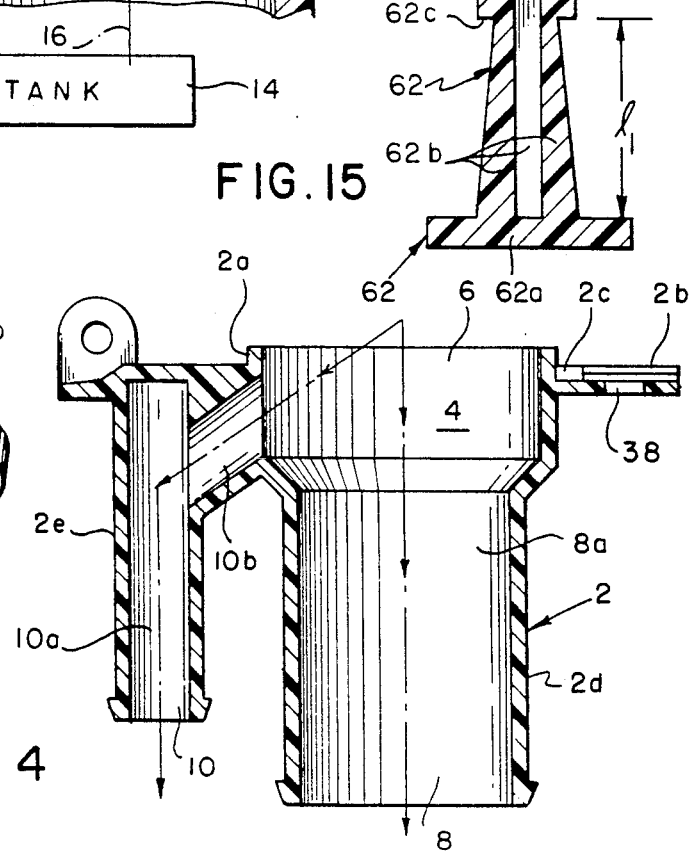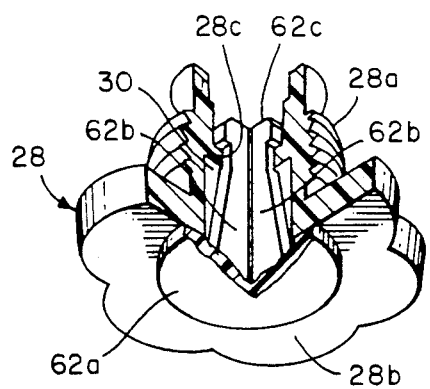

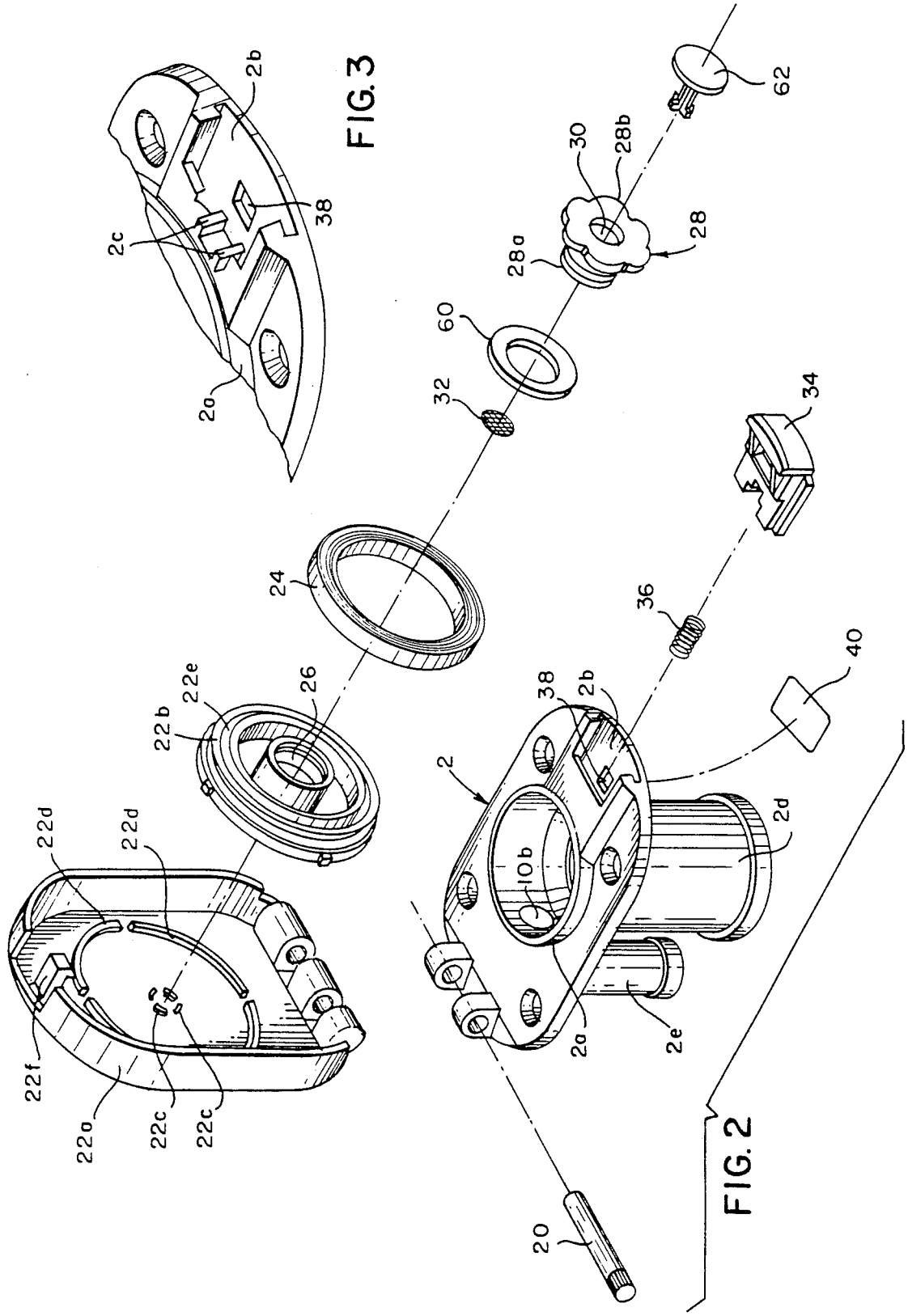

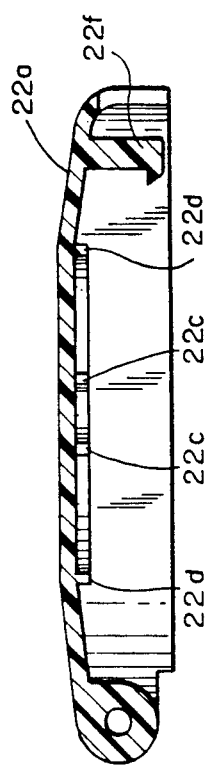
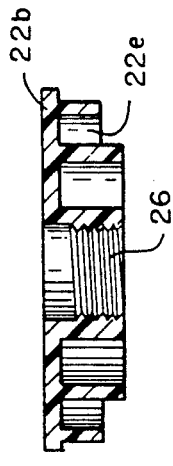
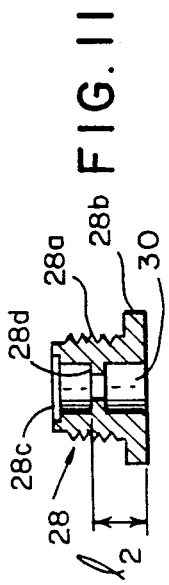
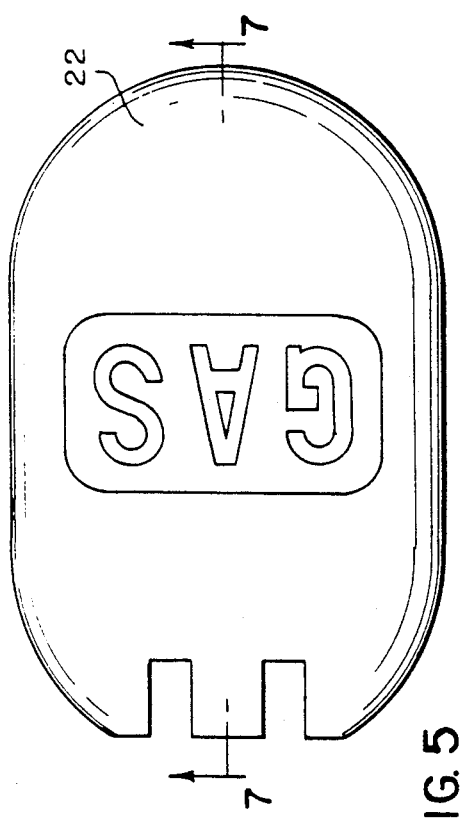
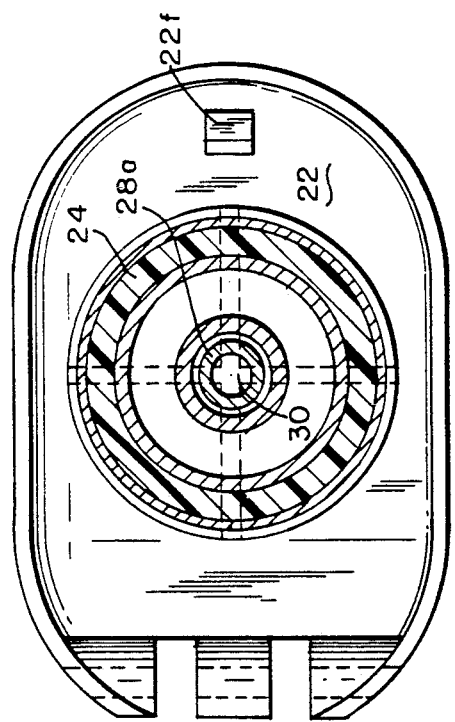
FIG.7  FIG.8  FIG.9  FIG.10  FIG.12  FIG.11
FIG.5  FIG.6

FUEL FILLING AND VENTING DEVICE WITH SURGE PROTECTOR

REFERENCE TO PRIOR APPLICATION

This is a continuation-in-part application based on the earlier continuation-in-part application Ser. No. 08/032,943 filed Mar. 17, 1993, entitled "Fuel Filling and Venting Device", now U.S. Pat. No. 5,275,213, which is, in turn, based on the earlier application Ser. No. 08/008,344 filed Jan. 22, 1993, now abandoned.

STATEMENT OF THE INVENTION

A liquid fuel tank filling and venting device is disclosed including a fuel cap containing a vent passageway in which are mounted both a flame-arresting screen and a fuel surge protecting device, whereby the fuel tank is normally vented through the vent passageway, but which is automatically closed and protected against leakage upon the occurrence of a fuel surge.

BRIEF DESCRIPTION OF THE PRIOR ART

Fuel filling devices for marine fuel tanks and the like are well known in the patented prior art, as evidenced by the prior patents to Fields et al U.S. Pat. No. 4,113,138, Scheurenbrand No. U.S. Pat. No. 4,450,880 and Fisher U.S. Pat. No. 4,722,454, among others. In the case of permanently installed marine fuel tanks, efforts have been made to improve the method of ventilating (i.e., releasing the air pressure of) the tanks during the filling thereof with liquid fuels such as gasoline or diesel fuel oil, or with water. It has been common in the past to provide two separate components for the tank filling and venting functions, such as a gas tank venting device, and a gas or diesel deck plate.

One problem with the known venting devices is protecting the craft against fuel surges that occasionally occur with high-speed sharply maneuverable watercraft, with the undesirable result that fuel escapes through the venting system.

The present invention was developed to provide a combined one-piece fuel filling and venting device that reduces labor and material manufacturing costs, which affords continuous venting of the fuel tank to atmosphere when the fuel cap is in either of its open or closed positions, which allows overflow fuel from the vent line to return to the fuel tank via the fuel supply passage formed in the hollow body member, and which contains automatically operable fuel surge protector means, thereby to avoid inadvertent fuel spills caused by overflow during refueling or leakage during high-speed maneuvers of the water craft.

SUMMARY OF THE INVENTION

Accordingly, a primary object of the present invention is to provide a fuel filling and venting device including a hollow body member containing a chamber, an upper fuel inlet opening for supplying fuel to the chamber, a lower fuel outlet opening for supplying fuel from the chamber to the tank, and an overflow opening for returning overflow fuel from the tank to the chamber during the tank filling operation, together with a fuel cap operable between closed and open positions relative to the inlet opening, said fuel cap containing a vent passageway for venting the fuel tank to atmosphere when the fuel cap is in the closed position, and backflame-arresting means and fuel surge protector means mounted in the vent passageway.

According to a more specific object of the invention, the back flame arresting screen is removably mounted in the vent passageway so as to provide unrestricted venting and to extinguish any flame front, thereby preventing its travel down the line and into the tank. Since the back-flame arresting screen is removably mounted on the fuel cap, it is conveniently located for removal and cleaning, and since it is functional only when the fuel cap is in the closed position, the screen or arrester is subjected only to relatively low fuel vapor flow rates, whereby clogging of the screen is reduced. The surge flow protector means is also mounted in the vent passageway and is in the form of a one-way valve device that is gravity-biased toward the open position when the fuel cap is in the closed position.

BRIEF DESCRIPTION OF THE DRAWINGS

Other objects and advantages of the invention will become apparent from a study of the following specification, when viewed in the light of the accompanying drawings, in which:

FIG. 1 is a sectional view of the fuel filling and venting device with the fuel cap member in the closed position;

FIG. 2 is an exploded perspective view of the apparatus of FIG. 1 with the fuel cap in the open position;

FIG. 3 is a detailed perspective view of the latching portion of the filling and venting body member of FIG. 2;

FIG. 4 is a sectional view of the body member of FIGS. 1-3;

FIG. 5 is a top view of the fuel cap member of FIG. 1;

FIG. 6 is a sectional view taken along line 6—6 of FIG. 1; and

FIGS. 7 and 8 are sectional views of the cover and seal retainer sections, respectively, of the fuel cap member of FIGS. 5 and 6;

FIGS. 9-12 are sectional views of the annular seal, the backflame screen, the vent bolt, and the sealing gasket, respectively, of FIGS. 1 and 2;

FIG. 13 is a cutaway perspective view of the plug with the surge protector in the closed position;

FIG. 14 is a top plan view of the surge protector of FIG. 13; and

FIG. 15 is a sectional view taken along line 15—15 of FIG. 14.

DETAILED DESCRIPTION

Referring first more particularly to FIGS. 1 and 2, the fuel filling and venting device includes a hollow body member 2 containing a chamber 4 and provided with a fuel inlet opening 6, a fuel outlet opening 8, and an overflow opening 10. The body member includes an annular neck portion 2a arranged concentrically about the fuel inlet opening 6. The outlet and overflow openings 8 and 10 are connected with the fuel tank 14 via conduits 16 and 18, respectively.

Hingedly connected with the upper portion of the body member 2 by means of pivot shaft 20 is a fuel cap closure member 22 that includes a cover section 22a, and an annular inner section 22b. As best shown in FIG. 2, the lower surface of the cover section 22a includes a plurality of integral circularly-arranged circumferentially-spaced first rib portions 22c, and a plurality of integral circularly-arranged circumferentially-spaced second rib portions 22d that are arranged in concentrically spaced relation about said first rib portions 22c. Referring to FIG. 1, the seal retainer section 22b has a flat upper surface that is permanently secured to the adjacent free extremities of the second cover rib portions 22d. Thus, when the cover and seal retainer sections are formed of a suitable synthetic plastic material (such as acetal resins and nylon resins, both in fiber and non-fiber filled variations, for example), the two sections may be secured together by high-frequency bonding techniques, by an adhesive, or other suitable securing means. In the case of sections formed from a metal or a metal alloy, the sections may be welded or otherwise bonded together. The lower end of the seal retainer section 22b contains an annular groove 22e for receiving a resilient annular seal member 24 which is arranged for seating engagement with the upper end extremity of the annular body member neck portion 2a when the fuel cap member is in the closed position illustrated in FIG. 1. The central bore 26 contained within the fuel retainer section 22b is threaded for screw-thread connection with the threaded portion 28a of a venting plug 28 having an enlarged head portion 28b, which plug contains a through bore defining a venting passage 30. Mounted in a counterbore 28c defined within the threaded end 28a of the venting plug 28 is a meshed screen or fibrous filter element 32 formed of a suitable synthetic plastic or metal filtering material. The venting plug 28 is normally threaded within the bore 26 to a position at which the screen element 32 is in seated engagement with the adjacent extremities of the integral first ribs 22c carried by the lower surface of the fuel cap cover section 22a when the fuel cap is in the illustrated closed position. Annular sealing gasket 60 mounted concentrically about the threaded portion of plug 28 is compressed between the plug enlarged hex head portion 28b and the cap cover section 22b.

In accordance with the present invention, normally-open surge protector means are mounted in the venting bore 30 for closing the vent passage upon the occurrence of a fuel surge condition (such as might occur for example when a small watercraft executes tight maneuvers), thereby to prevent fuel leakage. More particularly, the surge protector means includes a one-way valve member 62 formed from a suitable synthetic plastic material, such as an acetal resin or a nylon resin, both fiber-filled and non-fiber filled. The valve member includes a disk-shaped base portion 62a, and a plurality of upwardly extending resilient arm portions 62b that terminate at their upper ends in outwardly directed hook portions 62c that are arranged above an annular internal rib 28d formed on the wall surface of bore 30 contained in vent plug member 28. The distance $l_1$ between the hook portion 62c and the base portion 62a is greater than the distance $l_2$ (FIG. 11) between the upper surface of rib portion 28d and the lower surface of hex head portion 28b of the vent plug 28, whereby when the gravity-biased surge protector member 62 is in the open position shown in FIG. 1, vapors in chamber 8 are vented to atmosphere via surge protector valve member 62, bore 30, flame arresting filter 32 and the openings between ribs 22d.

While the surge protector valve member 62 has been indicated as being gravity-biased toward the open position, it is apparent that a small auxiliary biasing spring could be provided, if desired, thereby to assist in biasing the valve member 62 toward the open position. As will be described in greater detail below, upon the occurrence of a fuel surge, the valve member 62 is displaced upwardly relative to vent plug 28 toward the closed position of FIG. 13, whereupon the base portion 62a of the surge protector valve member 62 is in seated engagement with the head portion 28b of vent plug 28, thereby closing vent passage 30.

Latch means are provided for releasably locking the fuel cap member in its closed position shown in FIG. 1. To this end, the outer cover section 22a is provided on its inner surface with an integral downwardly extending keeper portion 22f, and the body member is provided with a latch button 34 that is slidably mounted in corresponding guide slot means 2b (as shown in FIGS. 2 and 3). A compression spring 36 is captured at one end between shoulder portions 2c on the body member 2, and at its other end in a corresponding recess contained in the adjacent end of the release button 34, said spring being operable to bias the release button to the right toward its locking position relative to keeper portion 22f, as shown in FIG. 1. The bottom wall of the guide groove means 2b contains a through opening 38 into which is snapped a resilient locking projection 34a integral with the release button 34, thereby to retain the release button 34 in the guide slot means 2b against the biasing force of spring 36. A label layer 40 is mounted (for example, by pressure sensitive adhesive means) on the lower surface of the guide slot means 2b, thereby to prevent caulking material from entering the opening 38 and adversely affecting the operation of the release button 34.

In the embodiment illustrated in FIGS. 1 and 2, the lower portion of the body member is bifurcated to define a pair of downwardly extending leg portions 2d and 2e the lower extremities of which contain the fuel outlet and overflow openings 8 and 10, respectively. The fuel outlet opening 8 is arranged directly below the fuel inlet opening 6 and is connected with chamber 4 via a generally linear fuel outlet passage 8a. The overflow opening 10 is connected with chamber 4 via a first passage portion 10a that is generally parallel with passage 8a, and an angularly inwardly directed second portion 10b. The diameter of the bypass opening and the associated passage portions is less than that of the fuel outlet opening 8.

In operation, the body member 2 of the fuel filling and venting device is mounted within an opening 50 contained in the boat structure adjacent the fuel tank 14. Flexible conduits 16 and 18 connect the fuel supply outlet 8 and the overflow opening 10, respectively, with the fuel tank 14. It will be assumed that the surge valve member 62 has been introduced within the bore 30 contained in vent plug 28 by compressing together the resilient arms 62a, whereby following insertion, the arms are permitted to spring apart to position the hook portions 62c above rib 28d.

In order to supply fuel to the fuel tank 14, release button 34 is inserted against the biasing force of spring 36, thereby to unlatch the button 34 from the keeper portion 22f, whereby fuel cap 22 including the annular retainer section 2b, the back flame arresting filter 32, the vent plug 28, the surge protector 62, and the annular seal 24 are pivoted upwardly as a unit to expose the fuel supply opening 2. Liquid fuel, such as gasoline or diesel oil, is pumped into the chamber 4 via inlet 6 and flows downwardly through passage 8a to outlet 8, whereupon the fuel is guided by conduit 16 into the fuel tank 14. During the filling operation, air is displaced upwardly through conduit 18 into chamber 4 via vent passage portions 10a and 10b. In the event that there were to be any fuel overflow during the filling operation, it is returned to the fuel tank via vent passages 10a and 10b, chamber 4, the downwardly extending fuel supply passage 8a, and conduit 16.

When the filling of the tank has been completed, the cover member 22 is pivoted to its closed position shown mn FIG. 1, whereupon the keeper member 22f snaps into locking engagement with the spring-biased release button 34. The fuel tank continues to be vented to atmosphere via conduit 18, overflow opening 10, overflow passage portions 10a and 10b, chamber 4, bore 30, the normally-open surge protection valve 62, the back flame arresting filter 32, and the radial spaces defined between the first and second integral ribs 22c and 22d.

While the body member 2 and the cover member 22 have been illustrated as being formed of synthetic plastic material, it is apparent that these components could be formed of metal, if desired.

As indicated above, when the fuel cap member is in the closed position indicated in FIG. 1, vapor flow rate is low, and clogging of the back flame arrester or screen 32 is reduced to a minimum.

Upon the occurrence of a fuel surge, the surge protection valve member 62 is displaced upwardly to the closed position of FIG. 13, thereby closing the vent passage 30.

While the preferred forms and embodiments of the invention have been illustrated and described, it will be apparent that other changes may be made without deviating from the inventive concepts set forth above.

What is claimed is:

1. Liquid fuel tank filling and venting apparatus, comprising:
   (a) a housing containing:
     (1) a chamber;
     (2) fuel inlet and fuel outlet openings in communication with, and arranged above and below, said chamber, respectively; and
     (3) a fuel tank vent opening in communication with said chamber, each of said fuel outlet and fuel vent openings being adapted for separate connection with the fuel tank;
     (4) said fuel outlet and fuel vent openings being so arranged relative to said fuel inlet opening that during the filling of the tank, the tank is vented by, and excess fuel is returned to, said chamber via said fuel vent opening;
   (b) closure means operable between closed and open positions relative to said housing for closing and opening said fuel inlet opening, respectively, said closure means containing means defining a vent passageway for continuously affording communication between said chamber and atmosphere when said closure means is in the closed position; and
   (c) normally-open surge protector means for closing said vent passageway upon the occurrence of a fuel surge in said chamber.

2. Apparatus as defined in claim 1, wherein said closure means comprises a fuel cap member arranged, when in the closed position, for seated engagement with said housing concentrically about said fuel opening, said vent passageway including a first portion that extends coaxially of, and is in communication at one end with, said fuel inlet opening when said cap member is in the closed position, and a second portion that extends radially outwardly from the other end of said passageway first portion, said second portion at its outer end being in communication with atmosphere; and means for mounting said surge protector means in said vent passageway first portion.

3. Apparatus as defined in claim 2, wherein said surge protector mounting means includes a vent plug threadably mounted in said vent passageway first portion, said vent plug containing a through bore containing said surge protector means.

4. Apparatus as defined in claim 3, wherein said surge protector means comprises valve means normally biased toward an open position relative to said vent plug through bore, said valve means being arranged for operation to a closed position relative to said vent plug through bore upon the occurrence of a fuel surge in said chamber.

5. Apparatus as defined in claim 4, wherein said valve means includes a valve member that is gravity-biased downwardly toward said open position, said valve member being movable upwardly toward said closed position.

6. Apparatus as defined in claim 5, wherein said vent plug through bore contains intermediate its ends an internal annular rib; and further wherein said valve member includes a base portion adapted for seated engagement with the bottom surface of said vent plug to close said through bore when said fuel cap is in the closed position, said valve member also including leg portions that extend upwardly from said base portion beyond said internal rib when said valve member is in said closed position, said leg portions having at their upper ends outwardly extending hook portions that extend above said annular rib, said hook portions being spaced from said base portion by a distance greater than the spacing distance between said rib and the surface of said plug adjacent said valve member base portion, whereby said valve member is gravity-based toward the open position with said base portion suspended from said internal rib by said leg portions.

7. Apparatus as defined in claim 3, and further including:
   (d) back-flame arrester means mounted in said vent passageway for screening the gases that flow therethrough when said fuel cap member is in the closed position.

8. Apparatus as defined in claim 7, wherein said back-flame arrester means comprises a generally planar screen member formed of screening material, and means including said vent plug for removably mounting said screen member transversely across said vent passageway first portion.

9. Apparatus as defined in claim 8, wherein said fuel cap includes a plurality of integral spaced circularly arranged first ribs opposite said fuel inlet opening when said fuel cap member is in the closed position; and further wherein said vent plug maintains said screen member in engagement with said first ribs.

10. Apparatus as defined in claim 9, wherein said cap member is sectional and includes an outer cover section having outer and inner surfaces, said first ribs being integral with the inner surface of said outer cover section, said cover section including on said inner surface a plurality of integral circularly-arranged circumferentially-spaced second ribs arranged concentrically about said first ribs, said cap member including also an annular seal retainer section arranged generally coaxially relative to said second ribs, said seal retainer section having at one end a generally flat surface bonded to the extremities of said second ribs, the other end of said seal retainer section containing an annular groove for receiving an annular seal, the central portion of said seal retainer section within said annular groove being in communication with said vent passageway first portion, whereby the spaces between said first ribs and between said second ribs, respectively, define radially extending second venting passageways.

11. Apparatus as defined in claim 9, and further wherein said vent plug includes an enlarged head portion, and further including annular gasket means compressed between said vent plug head portion and said fuel cap.

* * * * *